UNITED STATES PATENT OFFICE.

CHARLES WARREN DUVAL, OF NEW ORLEANS, LOUISIANA, ASSIGNOR OF TWO-THIRDS TO MAURICE J. COURET, OF NEW ORLEANS, LOUISIANA.

PROCESS OF MANUFACTURING A VACCIN FOR THE PREVENTION OF HOG-CHOLERA AND PRODUCT THEREFROM.

1,210,053. Specification of Letters Patent. Patented Dec. 26, 1916.

No Drawing. Application filed March 22, 1916. Serial No. 85,960.

*To all whom it may concern:*

Be it known that I, Charles Warren Duval, a citizen of the United States, residing at New Orleans, in the parish of Orleans and State of Louisiana, have invented certain new and useful Improvements in Processes of Manufacturing a Vaccin for the Prevention of Hog-Cholera and Product Therefrom; and I do hereby declare the following to be a full, clear, and exact description of the invention, such as will enable others skilled in the art to which it appertains to make and use the same.

My invention relates to the manufacture of a vaccin for the prevention of hog cholera, and it consists in a process whereby a vaccin is secured which, when properly applied, is safe and reliable to protect the hog for a period of at least a year, and probably indefinitely, against hog cholera.

My invention also includes the product of said process, as will be hereinafter more fully described.

I take from a hog which is in the advanced state of hog cholera, and therefore heavily infected with the virus, the blood, flesh, brain, heart, liver, spleen and kidneys and collect them under strict aseptic conditions, removing, as far as possible, the ligaments, capsules, vessels, etc. These organs and flesh are then passed through an ordinary meat grinder under aseptic conditions, and the mass thus obtained is thoroughly mixed with the blood taken from the infected hog. This mixture is then frozen by or through the agency of carbon dioxid snow, or other equivalent method, so as to facilitate its further pulverization. This is accomplished by triturating—that is to say, by mashing and grinding in a mortar, or some similar container. This trituration is done while the mass is in the frozen state. The mixture is then placed in glass or other suitable containers, and is then rapidly desiccated *in vacuo* at approximately freezing temperature (0° C.) over some neutral hygroscopic agent, such as sulfuric acid, caustic soda, or unslaked lime. During the process of desiccation, the water is completely removed, and there is left a residue of solid material in a finely divided condition. This residue is then ground to a fine powder under aseptic conditions. This powder contains the living virus of hog cholera, whose infectivity has not been appreciably altered by the foregoing treatment. The viability of the virus of hog cholera is thus preserved for such use as may be desired, and the possibility of its alteration or destruction through contaminating germs is eliminated. This powder is then transferred to air-tight containers and stored in a refrigerator maintained at or about freezing temperature (0° C.), under which condition its infectivity is maintained and found to be preserved unaltered for the entire period—a year or more during which the product has been under observation.

The powder produced in the above manner will hereinafter be called and referred to as the "virus powder" and it will be mixed, as will be hereinafter described, with a second powder which will be hereinafter called the "antitoxic powder", the mixture being the vaccin product for which I now claim a patent.

The antitoxic powder is produced as follows: A normal hog is taken and there is injected into this hog, in proper increasing quantities and at appropriate intervals, the virus of hog cholera, either in the form of the virus powder, above referred to, or in the fresh state (the virus powder being cheaper and more economically produced and preserved than the virus in the fresh state). This produces in such a hog a high immunity. This immunity should be raised by the method aforesaid to that point at least where five milligrams of inactivated and subsequently desiccated serum from this animal will sensitize one milligram of the virus powder above described. Proper standardization must be had as in all bacteriological products. The blood of the hog, thus immunized, is drawn from the hog from time to time, as required, due regard being had always to draw the blood at a time when the immunity is at proper height. If the immunity be not at proper height, the immunity should be heightened as and to the extent hereinabove set forth. The blood so drawn from the hog is first defibrinated, and then it is centrifugalized, or permitted to stand for a sufficiently long time—say 24 hours. By this process of centrifugalization, or standing, the heavy material in the blood settles, and the clear serum remains on the top; it is then drawn off into other containers. The clear serum thus obtained is inactivated at a temperature of approximately 56° C. for thirty minutes, and is then desiccated rapidly *in vacuo* at approximately freezing temperature (0° C.) over some neutral hygroscopic agent such as sulfuric acid, caustic soda or unslaked lime. The potency of the desiccated powder thus obtained can be maintained for a year or more, and possibly indefinitely, if kept at approximately freezing temperature (0° C.). The virus powder maintained at approximately freezing temperature (0° C.) is then mixed with the "antitoxic powder" likewise maintained at approximately freezing temperature (0° C) in the following proportions and manner, to wit: The proportion of this mixture is one part by weight of "virus powder" to approximately fifty parts by weight of "antitoxic powder." To obtain a more uniform mixture of these powders, the "virus powder" is emulsified in sterile water in the proportions of one quarter of one cubic centimeter (0.25 C. C.) of water to one milligram (1 mg.) of "virus powder." Add to this emulsion the proper proportion of "antitoxic powder," as above set forth, and again thoroughly emulsify. This mixture is then subjected to a temperature of approximately 37° C. for an hour, or to room temperature (20°–25° C.) for from six to twelve hours. By this latter method, sensitization of the "virus powder" is effected. This mixture, or sensitized emulsion, is then desiccated rapidly *in vacuo* at approximately freezing temperature (0° C.) over some neutral hygroscopic agent, such as sulfuric acid, caustic soda or unslaked lime. The powder thus obtained is the finished product, or vaccin, and it is ready for administration. Meanwhile, and until necessary for practical use, it is kept in sealed glass containers at approximately freezing temperature (0° C.).

When needed for practical administration, the product is mixed with some suitable vehicle such as glycerin, and applied to a pointed instrument for the purpose of vaccination; or it may be suspended in sterile water and injected in the hog hypodermatically; or it may be injected into the hog hypodermatically in the form of a pellet. This product is not infectious in any quantity. The dose thereof for protection against the natural disease (hog cholera) is 50 milligrams; in localities where the disease exists in more virulent form, larger doses may be used with advantage. By increasing the dose, and repeating the administration at suitable intervals, the immunity of the hog can be heightened or raised and brought to that point known as "hyperimmunization," when its blood can be drawn off and used in the production of commercial "antitoxin."

In the hereinbefore described method the virulent "virus powder" is employed mixed with "antitoxin powder;" but similar results may be obtained by attenuating or killing the virus in the virus powder, as will be hereinafter described.

The proportion by weight of "virus powder" and "antitoxic powder" may be changed from that of one to fifty, as hereinabove set forth, by previously attenuating or destroying the viability of the "virus powder", and then mixing the attenuated or killed "virus powder" with the "antitoxic powder", following the method above described. This attenuation or destruction of viability is accomplished by subjecting the "virus powder", suspended in sterile water, to a temperature of from 10° C. to 60° C. for periods ranging, respectively, from four months to one hour. By these processes of either attenuation or killing, the infectivity of the "virus powder" is lessened or destroyed without its immunizing property being affected. Thus, if the "virus powder", so suspended, be subjected to a temperature of 10° C. for a period of about twenty weeks, such attenuation is accomplished; while if the "virus powder", so suspended, be subjected to a temperature of approximately 38° C. for a period of four weeks, such attenuation is likewise accomplished. Again, if the "virus powder", so suspended, be subjected to a temperature of approximately 60° C. for a period of approximately one hour its viability is destroyed. Within these limits the attenuation of the "virus powder", or the destruction of its viability, may be accomplished by proper experimentation, and the relative temperature and time fixed.

When such attenuated or killed "virus powder" is used in mixture with the "antitoxic powder", following the hereinabove described method of sensitization, the proportion by weight of attenuated or killed "virus powder" to the "antitoxic powder" varies from one to forty to one to five, depending upon the degree of attenuation up to the complete destruction of viability. The proper proportions within these limits must be determined by standardization.

The dose is the same whether the product be made with the virulent "virus powder" or with the attenuated or killed "virus powder"; and the administration of the vaccine is had in the same way.

The hereinbefore described methods provide for the previous desiccation of the virus and the antitoxic serum before bringing them into admixture. However, instead of mixing the "virus powder," either virulent, attenuated or killed, with the "antitoxic powder," it is equally practicable to mix the "virus powder" with the clear inactivated antitoxic serum in its fresh state, in the proportion of one milligram of "virus powder" to one-half of 1 cubic centimeter (C. C.) of said serum. These materials are then thoroughly mixed, and sensitization effected by subjecting to the temperature, as in the manner hereinabove set forth, after which the mixture is rapidly desiccated *in vacuo* at approximately freezing temperature (0.° C.) over some neutral hygroscopic agent, such as sulfuric acid, caustic soda, or unslaked lime.

It will be noted that the sensitized virus may be employed in its liquid condition without being finally reduced to the desiccated or powdered state as above described; but I prefer to reduce the product to the final desiccated state for convenience in handling and administering same.

This completed dried product, like the completed product obtained by the mixture of the "virus powder" with the "antitoxic powder" is returned to approximately freezing temperature (0° C.) until necessary for practical administration, and it may be administered in the same dose and manner as hereinabove described. Thus, it will be seen that I use the "virus powder," either in the virulent, attenuated, or killed state, with either the antitoxic serum in the powdered state, or in the fresh, or liquid state.

I claim as my invention.

1. The process for the production of a vaccin product for the prevention of hog cholera which consists in removing from the infected hog parts containing the virulent virus, desiccating the mass so secured, and converting same into the powdered form, and finally mixing this product with inactivated antitoxic serum, and sensitizing the same.

2. The process for the production of a vaccin product for the prevention of hog cholera which consists in removing from the infected hog parts containing the virulent virus, desiccating the mass so secured, and converting same into the powdered form, attenuating the virus of the desiccated powder so secured, and finally mixing this product with inactivated antitoxic serum, and sensitizing the same.

3. The process for the production of a vaccin product for the prevention of hog cholera which consists in removing from the infected hog parts containing the virulent virus, desiccating the mass so secured, and converting same into the powdered form, killing the virus of the desiccated powder so secured, and finally mixing this product with inactivated antitoxic serum, and sensitizing the same.

4. The process for the production of a vaccin product for the prevention of hog cholera which consists in removing from the infected hog parts containing the virulent virus, desiccating the mass so secured, and converting same into the powdered form, and finally mixing this product while suspended in sterile water with inactivated antitoxic serum, also in the desiccated and powdered form, and sensitizing the same.

5. The process for the production of a vaccin product for the prevention of hog cholera which consists in removing from the infected hog parts containing the virulent virus, desiccating the mass so secured, and converting same into the powdered form, attenuating the virus of the desiccated powder so secured, and finally mixing this product, while suspended in sterile water, with inactivated antitoxic serum, also in the desiccated and powdered form, and sensitizing the same.

6. The process for the production of a vaccin product for the prevention of hog cholera which consists in removing from the infected hog parts containing the virulent virus, desiccating the mass so secured, and converting same into the powdered form, killing the virus of the desiccated powder so secured, and finally mixing this product, while suspended in sterile water, with inactivated antitoxic serum, also in the desiccated and powdered form, and sensitizing the same.

7. The process for the production of a vaccin product for the prevention of hog cholera which consists in removing from the infected hog parts containing the virulent virus, desiccating the mass so secured at a temperature of approximately 0° C., and converting same while at substantially the same temperature into the powdered form, mixing the product with inactivated antitoxic serum, and then sensitizing the same.

8. The process for the production of a vaccin product for the prevention of hog cholera which consists in removing from the infected hog parts containing the virulent virus, desiccating the mass so secured at a temperature of approximately 0° C., and converting same while at substantially the same temperature into the powdered form, attenuating the virus of the desiccated powder so secured, mixing the product with inactivated antitoxic serum, and then sensitizing the same.

9. The process for the production of a vaccin product for the prevention of hog cholera which consists in removing from the infected hog parts containing the virulent virus, desiccating the mass so secured at a temperature of approximately 0° C., and converting same while at substantially the same temperature into the powdered form, killing the virus of the desiccated powder so secured, mixing the product with inactivated antitoxic serum, and then sensitizing the same.
10. The process for the production of a vaccin product for the prevention of hog cholera which consists in removing from the infected hog parts containing the virulent virus, desiccating the mass so secured at a temperature of approximately 0° C., and converting same while at substantially the same temperature into the powdered form, then securing from the blood of a highly immunized hog the clear serum, inactivating same by subjecting it to a temperature of approximately 56° C. for substantially 30 minutes, then mixing this latter product with the virus powder, subjecting the mixture to a temperature of approximately 37° C. for approximately one hour, whereby sensitization of the virus is produced, and finally desiccating the sensitized mass.

11. The process for the production of a vaccin product for the prevention of hog cholera which consists in removing from the infected hog parts containing the virulent virus, desiccating the mass so secured at a temperature of approximately 0° C., and converting same while at substantially the same temperature into the powdered form, then securing from the blood of a highly immunized hog the clear serum, inactivating same by subjecting it to a temperature of approximately 56° C. for substantially 30 minutes, desiccating this serum and reducing the mass to the powdered form, then suspending the two powders in suitable proportions in sterile water, subjecting the emulsion to a temperature of approximately 37° C. for approximately one hour, whereby sensitization of the virus is produced, and finally desiccating the sensitized mass.

12. The process for the production of a vaccin product for the prevention of hog cholera which consists in removing from the infected hog parts containing the virulent virus, desiccating the mass so secured at a temperature of approximately 0° C., converting same while at substantially the same temperature into the powdered form, and attenuating the virus of the desiccated powder so secured; then securing from the blood of a highly immunized hog the clear serum, inactivating same by subjecting it to a temperature of approximately 56° C. for substantially 30 minutes; then mixing this latter product with the virus powder, subjecting the mixture to a temperature of approximately 37° C. for approximately one hour, whereby sensitization of the virus is produced, and finally desiccating the sensitized mass.

13. The process for the production of a vaccin product for the prevention of hog cholera which consists in removing from the infected hog parts containing the virulent virus, desiccating the mass so secured at a temperature of approximately 0° C., converting same while at substantially the same temperature into the powdered form, and attenuating the virus of the desiccated powder so secured; then securing from the blood of a highly immunized hog the clear serum, inactivating same by subjecting it to a temperature of approximately 56° C. for substantially 30 minutes, desiccating this serum and reducing the mass to the powdered form; then suspending the two powders in suitable proportions in sterile water, subjecting the emulsion to a temperature of approximately 37° C. for approximately one hour, whereby sensitization of the virus is produced; and finally desiccating the sensitized mass.

14. The process for the production of a vaccin product for the prevention of hog cholera which consists in removing from the infected hog parts containing the virulent virus, desiccating the mass so secured at a temperature of approximately 0° C., converting same while at substantially the same temperature into the powdered form, and killing the virus of the desiccated powder so secured; then securing from the blood of a highly immunized hog the clear serum, inactivating same by subjecting it to a temperature of approximately 56° C. for substantially 30 minutes; then mixing this latter product with the virus powder, subjecting the mixture to a temperature of approximately 37° C. for approximately one hour, whereby sensitization of the virus is produced; and finally desiccating the sensitized mass.

15. The process for the production of a vaccin product for the prevention of hog cholera which consists in removing from the infected hog parts containing the virulent virus, desiccating the mass so secured at a temperature of approximately 0° C., converting same while at substantially the same temperature into the powdered form, and killing the virus of the desiccated powder so secured; then securing from the blood of a highly immunized hog the clear serum, inactivating same by subjecting it to a temperature of approximately 56° C. for substantially 30 minutes, desiccating this serum and reducing the mass to the powdered form; then suspending the two powders in suitable proportions in sterile water, subjecting the emulsion to a temperature of approximately 37° C. for approximately one hour, whereby sensitization of the virus is produced; and finally desiccating the sensitized mass.

16. The process for the production of a vaccin product for the prevention of hog cholera which consists in removing from the infected hog parts containing the virulent virus, desiccating the mass so secured, and converting same into the powdered form, mixing this product with inactivated antitoxic serum, sensitizing the same, and finally desiccating the mass and reducing the same to the powdered form.

17. The process for the production of a vaccin product for the prevention of hog cholera which consists in removing from the infected hog parts containing the virulent virus, desiccating the mass so secured, and converting same into the powdered form, attenuating the virus of the desiccated powder so secured, and finally mixing this product with inactivated antitoxic serum, sensitizing the same, and finally desiccating the mass and reducing the same to the powdered form.

18. The process for the production of a vaccin product for the prevention of hog cholera which consists in removing from the infected hog parts containing the virulent virus, desiccating the mass so secured, and converting same into the powdered form, killing the virus of the desiccated powder so secured, and finally mixing this product with inactivated antitoxic serum, sensitizing the same, and finally desiccating the mass and reducing the same to the powdered form.

19. The process for the production of a vaccin product for the prevention of hog cholera which consists in removing from the infected hog parts containing the virulent virus, desiccating the mass so secured, converting same into the powdered form, then mixing this product, while suspended in sterile water, with inactivated antitoxic serum, also in the desiccated and powdered form, sensitizing the same, and finally desiccating the mass and reducing the same to the powdered form.

20. The process for the production of a vaccin product for the prevention of hog cholera which consists in removing from the infected hog parts containing the virulent virus, desiccating the mass so secured, converting same into the powdered form, attenuating the virus of the desiccated powder so secured, then mixing this product, while suspended in sterile water, with inactivated antitoxic serum, also in the desiccated and powdered form, sensitizing the same, and finally desiccating the mass and reducing the same to the powdered form.

21. The process for the production of a vaccin product for the prevention of hog cholera which consists in removing from the infected hog parts containing the virulent virus, desiccating the mass so secured, converting same into the powdered form, killing the virus of the desiccated powder so secured, then mixing this product, while suspended in sterile water, with inactivated antitoxic serum, also in the desiccated and powdered form, sensitizing the same, and finally desiccating the mass and reducing the same to the powdered form.

22. A product for the prevention of hog cholera comprising a vaccin material made from the desiccated product of any one or more of the blood or other soft tissues of a hog infected with hog cholera, subsequently sensitized by mixing the same with the inactivated antitoxic serum of an immunized hog.

23. A product for the prevention of hog cholera comprising a vaccin material made from the desiccated product of any one or more of the blood or other soft tissues of a hog infected with hog cholera, subsequently attenuated and thereafter sensitized by mixing the same with the inactivated antitoxic serum of an immunized hog.

24. A product for the prevention of hog cholera comprising a vaccin material made from the desiccated product of any one or more of the blood or other soft tissues of a hog infected with hog cholera, the viability of which virus has been destroyed, and thereafter sensitized by mixing the same with the inactivated antitoxic serum of an immunized hog.

25. A product for the prevention of hog cholera comprising a vaccin material in the form of a dry powder, made from the desiccated product of any one or more of the blood or other soft tissues of a hog infected with hog cholera and subsequently sensitized by mixing the same with the inactivated antitoxic serum of an immunized hog.

26. A product for the prevention of hog cholera comprising a vaccin material in the form of a dry powder, made from the desiccated product of any one or more of the blood or other soft tissues of a hog infected with hog cholera and subsequently attenuated and thereafter sensitized by mixing the same with the inactivated antitoxic serum of an immunized hog.

27. A product for the prevention of hog cholera comprising a vaccin material in the form of a dry powder, made from the desiccated product of any one or more of the blood or other soft tissues of a hog infected with hog cholera, the viability of which virus has been destroyed and thereafter sensitized by mixing the same with the inactivated antitoxic serum of an immunized hog.

In testimony whereof I affix my signature.

CHARLES WARREN DUVAL.